United States Patent [19]

Parker

[11] Patent Number: 4,703,465
[45] Date of Patent: Oct. 27, 1987

[54] METHOD AND APPARATUS FOR PRODUCING AN AUDIO MAGNETIC TAPE RECORDING FROM A PRESELECTED MUSIC LIBRARY

[75] Inventor: Lorne A. Parker, Middleton, Wis.

[73] Assignee: 1K Entertainment Center Ltd., Quebec, Canada

[21] Appl. No.: 804,803

[22] Filed: Dec. 4, 1985

[51] Int. Cl.⁴ .............................................. G11B 7/28
[52] U.S. Cl. ....................................... 369/30; 369/85;
  360/15; 360/79; 364/900; 364/479
[58] Field of Search ..................... 360/13, 15, 69, 72.1,
  360/79, 137; 369/1, 2, 14, 15, 20, 30, 33, 34, 37,
  52, 69, 70, 84, 85, 275; 235/419, 449, 454, 381;
  340/825.24; 364/200, 410, 468, 478, 479, 900

[56] References Cited

U.S. PATENT DOCUMENTS

| | | | |
|---|---|---|---|
| 3,990,710 | 11/1976 | Hughes | 369/34 |
| 4,141,045 | 2/1979 | Sheehan | 360/15 |
| 4,227,220 | 10/1980 | Brown et al. | 360/15 |
| 4,325,135 | 4/1982 | Dil et al. | 369/275 |
| 4,355,338 | 10/1982 | Yamamoto et al. | 360/15 |
| 4,528,643 | 7/1985 | Freeny, Jr. | 364/900 |
| 4,597,058 | 6/1986 | Izumi et al. | 364/900 |

FOREIGN PATENT DOCUMENTS

| | | | |
|---|---|---|---|
| 2625695 | 12/1977 | Fed. Rep. of Germany | 360/15 |
| 56-83846 | 7/1981 | Japan | 360/15 |
| 2013865 | 2/1983 | United Kingdom | 360/15 |

Primary Examiner—Raymond F. Cardillo
Assistant Examiner—Steven R. Garland
Attorney, Agent, or Firm—Thomas I. Rozsa

[57] ABSTRACT

The invention relates to a method and apparatus for choosing a random group of musical selections which are housed in a prerecorded disk library and creating an individual customized tape cassette from the selections chosen. Through use of the present invention, a multiplicity of selections from a selection music library are chosen and electrically transmitted to a selection duplicating center where they are duplicated at high speed onto a blank recording tape cassette in the desired order selected. The duplication process is performed at high speed in order to enable the cassette to be made in only a few minutes from the selections chosen.

8 Claims, 4 Drawing Figures

METHOD AND APPARATUS FOR PRODUCING AN AUDIO MAGNETIC TAPE RECORDING FROM A PRESELECTED MUSIC LIBRARY

BACKGROUND OF THE INVENTION

1. Field of the Invention

The present invention relates to a consumer oriented audio and video center wherein a purchaser may produce his own audio cassette tape from selections found in a tape library housed within the present invention. In general, the present invention relates to machines which are capable of selecting a multiplicity of randomly chosen audio selections from a tape library and transmitting the selected tapes to a duplicating center wherein they are duplicated onto a master blank recording tape in the desired order selected.

2. Description of the Prior Art

There is presently no known apparatus which combines the functions of the present invention in the coherent integrated system. There are many individual components which can perform selected functions which are performed by the present invention. For example, a combination audio/video player is now available commercially from Pioneer Corporation. Individual cassette duplicating machines are also known in the prior art. Coin and/or dollar bill accepting and changing machines are also known in the prior art.

While the above mentioned and other individual components are known, there is no single combined wholly integrated unit which performs the unique functions of the present invention.

SUMMARY OF THE PRESENT INVENTION

The present invention relates to a consumer oriented audio and video center wherein a purchaser may produce his own audio cassette tape from selections found in a tape library housed within the present invention. In general, the present invention relates to machines which are capable of selecting a multiplicity of randomly chosen audio selections from a tape library and transmitting the selected tapes to a duplicating center wherein they are duplicated onto a master blank recording tape in the desired order selected.

The present invention performs the following functions: (1) presents an audio/video display of recordings available to the consumer; (2) accepts payment for customized tapes; (3) makes change of the money deposited, if required; (4) allows the patron to make his personal selection of songs; (5) confirms the selections made by the patron so that errors can be corrected before the customized tape is produced; (6) records a cassette of appropriate length based on the number and length of the individual selections desired; (7) prints a specific label for the cassette setting forth the specific songs selected; (8) issues a complete audio cassette to the patron.

Flipping through the FM or Am dial usually brings the same thought to the minds of music enthusiasts. Wouldn't it be convenient and inexpensive if, instead of having to purchase 10 albums for the 10 appealing hits on the radio, one could purchase a tape of these favorites? One can, of course, given a tape deck and plenty of radio listening time, or access to entire albums. The present invention permits the individual to custom create, in seconds, a high-quality "hit" cassette tape of favorite selections from a repertoire of over 1000.

Some record companies regularly offer "Hit" albums featuring hits from an era, a season, a particular style or artist, but these take months, even years to appear on the market. The present invention leaps over these inconveniences. The present invention 1K Entertainment Center is an electronic storage and distribution system that will allow shoppers, at department, discount and record stores, to select and sequence songs for instantaneous reproduction on audio cassette. A computer display terminal of the present invention displays a catalog of continually updated songs from a full spectrum of music styles. The shopper can create a custom tape with, for example selections from musicians ranging from Madonna to Mozart. At the push a button, a shopper can produce in approximately 60 seconds a high-quality, custom length cassette with up to 10 individual selections. In essence, the present invention allows the consumer to create a musical tape of favorite selections from a variety of albums available. The present invention therefore offers the consumer convenience, timeliness, simplicity and choice.

The major object of the present invention 1K Entertainment Center is to provide an automatic, fully independent device which produces customized audio cassette tapes according to the directions it receives from the input keyboard as selected by the consumer.

An additional object of the present invention is to provide a low cost method of enabling consumers to obtain any multiplicity of different records all produced on one cassette at a minimum of expense.

Another object of the present invention is to present an audio-video display of the recordings in its library.

A further object of the present invention is to provide a self testing system which can check and trouble shoot problems within the system and provide a very efficient operating assembly which requires a minimum of maintenance.

Further novel features and other objects of the present invention will become apparent from the following detailed description, discussion and the appended claims taken in conjunction with the drawings.

DRAWING SUMMARY

Referring to the drawings for the purpose of illustration only and not limitation, there is illustrated:

DETAILED DESCRIPTION OF THE PREFERRED EMBODIMENT

Figure 1:
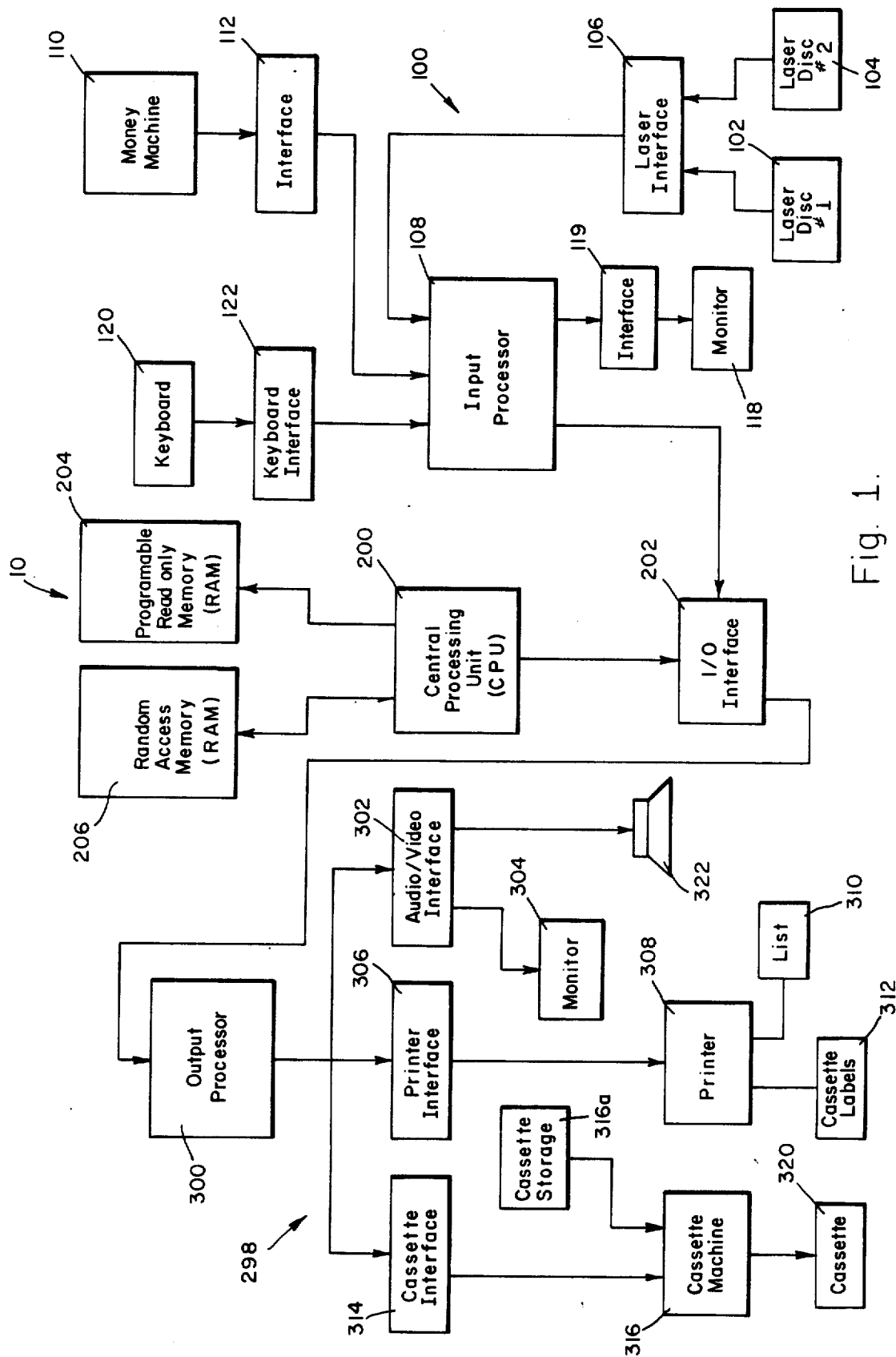
FIG. 1 is a block diagram of the present invention 1 K Entertainment Center.

Although the apparatus and method of the present invention will now be described with reference to specific embodiments in the drawings, it should be understood that such embodiments are by way of example and merely illustrative of but a small number of the many possible specific embodiments which can represent applications of the principals of the invention. Various changes and modifications obvious to one skilled in the art to which the invention pertains are deemed to be within the spirit, scope and contemplation of the invention as further defined in the appended claims.

The Central Processing Unit (or CPU) shown at 200 in FIG. 1 is the heart of the present invention 1K Entertainment Center 10. The internal micro processor is responsible for controlling the input to the machine in the form of laser disc information or money or keyboard information. The Central Processing Unit 200 is also responsible for controlling the output of the machine which will be an audio/visual advertising output, the printer output to provide a list of tapes available or cassette labels, and the cassette itself. The software aspect of the central processing unit will be stored in the programmable read only memory and there will also be random access memory to provide some memory working space. By way of example the Central Processing Unit 200 can be a sixteen bit microcomputer with interface means and software to communcaite with the Input Processing Means and the Output Processing Means of the present invention.

Figure 4:
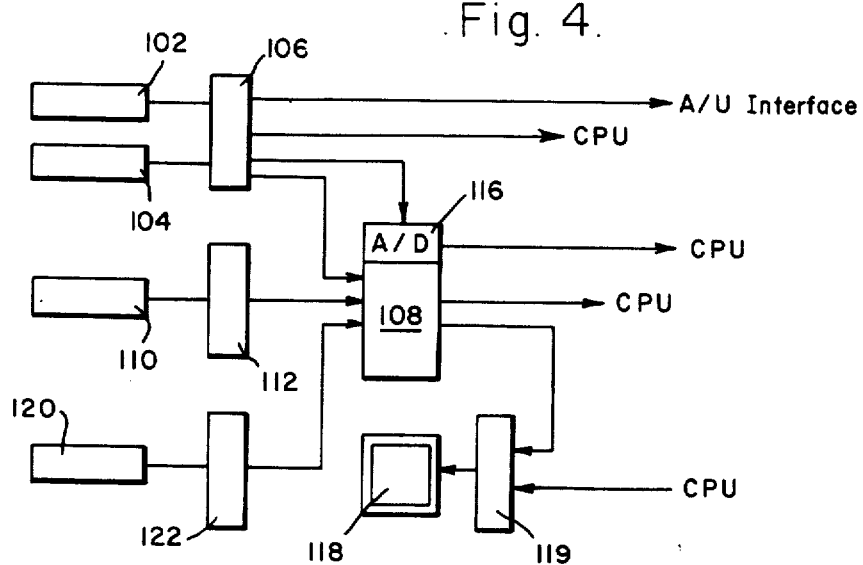
FIG. 4 is a block diagram of the Input Processing Means of the present invention.

The Input Processing Means 100 is shown in FIG. 1 and also in greater detail in FIG. 4. The Input Processing Means 100 comprises a First Laser Disc Means 102 and a Second Laser Disc Means 104. The video and audio libraries of the 1K Entertainment Center 10 are stored on the laser discs. The playback of the First Laser Disc Means 102 and Second Laser Disc Means 104 provides both the video and audio outputs of the system. The function of First Laser Disc Means 102 is to read information in a forward direction. The function of Second Laser Disc means 104 is to read information in a reverse direction. By having one laser disc read in a forward direction and one laser disc read in a reverse direction, the present invention 1K Entertainment Center 10 can produce a cassette in one continuous motion. First Laser Disk Means 102 and Second Laser Disc Means 104 are connected to Laser Disk Interface Means 106. The Laser Disk Interface Means 106 is connected to the Input Processor Means 108 (IP). The laser disc machine comprises First Laser Disc Means 102 and Second Laser Disc Means 104 which can be controlled via an RS-232C communications port connected to the Input Processor Means 108. The audio output used in the production of the cassette is transformed to a digital signal in the Analog to Digital (A/D) Converter Section 116 of the Input Processor Means 108 and stored in the Random Access Memory 206 of the Central Processing Unit 200. As will be described later on. the video output used in the display of the 1K Entertainment System library is fed directly to the output monitor and the output loudspeaker.

Money Machine Means 110 is connected through Money Interface Means 112 to the Input Processor Means 108. The Money Machine Means 110 and its Associated Interface Means 112 will, through the Input Processor Means 108 control the monetary functions necessary for the user to gain access to the the present invention 1K Entertainment Center 10. The Money Machine Means 110 communicates with the Central Processing Unit 200 via the Interface Means 112 using standard communication protocol.

A Keyboard 120 is connected through Keyboard Interface Means 122 to the Input Processor Means 108. The Keyboard 120 is the human interface to the 1K Entertainment Center 10. The Input Processor Means 108 is in turn connected via Monitor Interface Means 119 to Monitor 118. All commands from the user will be input d through the Keyboard 120 and his/her responses will be seen on the video Monitor 118 directly in front of him/her. This specialized Keyboard 120 will allow quick information input into the system. By way of example this may be a standard computer keyboard and interface.

The Input Processor Means 108 is connected through an Input/Output Interface Means 202 to the Central Processing Unit 200 and also to the Output Processor Means 300.

The Input Processor Means 108 can be a sixteen bit microprocessor with associated memory and communications software enabling it to support the Keyboard 120, a laser disc machine embodying First Laser Disc Means 102 and Second Laser Disc Means 104, and the Money Handling Machine 110 inputs, as well as communicate with the Central Processing Unit 200. The Input Processing Means 108 may contain an Analog to Digital (A/D) Converter Means 116 necessary to transform the audio signal from the laser discs.

Figure 2:
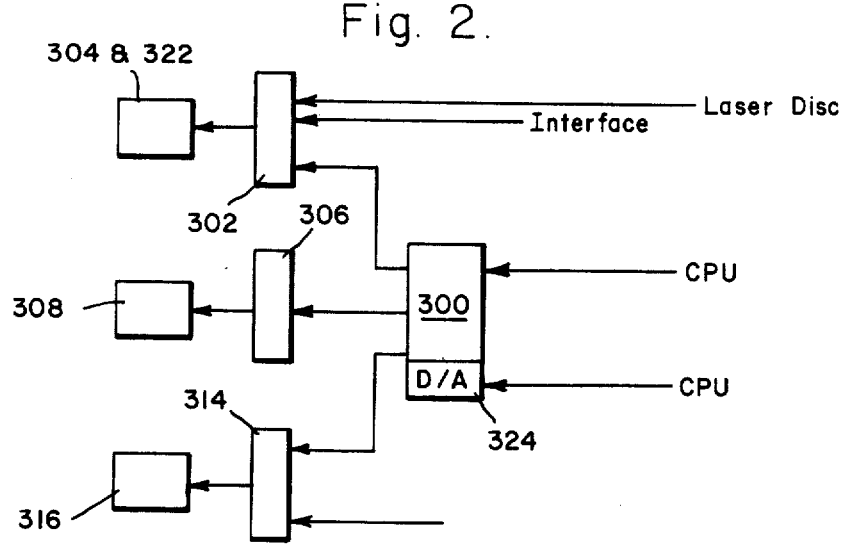
FIG. 2 is a block diagram of the Output Processing Means of the present invention.
Figure 3:
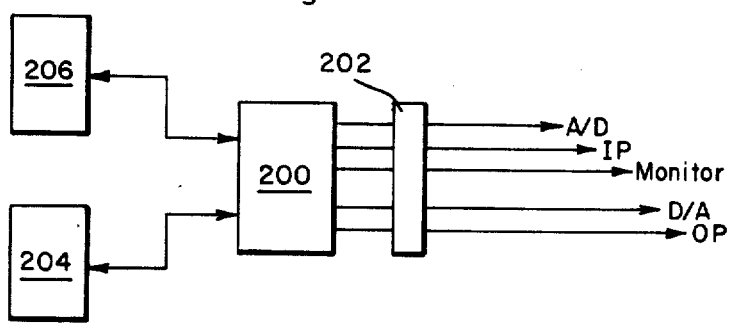
FIG. 3 is a block diagram of the Central Processing Unit and associated components of the present invention.

The Output Processing Means 298 is shown in FIG. 1 and in greater detail in FIG. 2. The Output Processing Means comprises the Output Processor Means 300 (OP) and its associated subsidiary elements.

One of the functions of the 1K Entertainment Center 10 will be to provide an audio/video output (A/V) to act as an advertising scheme. As shown in FIG. 1, One of the Laser Disc Means, either 102 or 104, is connected through Laser Disc Interface Means 106 to Input Processor Means 108 and through Input/Output Interface 202 to Output Processor Means 300 which in turn is connected to an Audio/Video Interface Means 302 which in turn is connected to large Color Monitor 304. Integrated with the Color Monitor 304 is an audio amplifler with high fidelity loudspeakers 322. The information is read off of Laser Disc Means 102 or 104 and replayed over Color Monitor 304 which will contain within it a high fidelity speaker, to attract potential users to the 1K Entertainment Center 10. The interface of the Monitor 304 with the Output Processor Means 300 and Central Processing Unit 200 provides testing and monitoring capabilities.

Output Processor Means 300 is also connected via Printer Interface Means 306 to Printer Means 308. The Printer Means 308 will be capable of printing the list of songs on file 310 within the system and also will print the Cassette Labels 312 to be affixed to the individual cassettes as they are produced. The Printer Means 308 may be a high speed parallel model printer with associated mechanics to provide the necessary for cutting and delivering of the printed output.

The Output Processor Means 300 is also connected via Cassette Interface Means 314 to selection Duplicating and Means 316. The Cassette Interface Means 314 may be an RS-232C interface for communications with the Central Processing Unit 200 and Output Processor Means 300. The selection Duplicating and Cutting Means 316 has access to the tape library and will duplicate the desired selections on its cassette machine portion. Internal Cassette Storage Means 318 is connected to the selection Duplicating and Cutting Means 316 to provide blank cassette cartridges. The selection Duplicating Means 316 will then dispense completed cassettes 320. By way of example, the selection Duplicating Means 316 may record the desired audio information on to the standard audio cassette. Recording may be performed at high speed (approximately 15 times normal) on pre-cut cassettes. The selection Duplicating Means 316 also consists of the automation necessary to load the cassette from storage and deliver the completed cassette to the patron.

The Output Processor Means 300 may be a sixteen bit microcomputer with associated memory. In addition the Output Processor Means 300 may house Digital To Analog (D/A) Converter 324 to transform the digitized audio signal to the necessary format for the cassette machine. The Output Processor Means 300 communicates with the Central Processing Unit 200 to insure proper operation of the output of the 1K Entertainment Center 10.

The Central Processing Unit 200 is the heart of the 1K Entertainment Center 10. An internal micro processor will be responsible for controlling the input to the machine in the form of laser disc information via First Laser Disc Means 102 and Second Laser Disc Means 104 and keyboard information via Keyboard 120, and money machine regulation via Money Machine 110. It is also responsible for controlling the output of this machine which will be an audio/visual output via Monitor 304, the printer output via Printer 308 and the cassette output via selection Duplicating Means 316. The software of the Central Processing Unit 200 will be stored in the Programmable Read Only Memory 204. The Central Processing Unit 200 will also have Random Access Memory 206 to provide some memory working space.

The Central Processing Unit 200 controls the Input Processor 108 and the Output Processor 300 as well as the internal routines of the 1K Entertainment Center 10. The system will also contain a self test function and service program, both of which will be stored in the Programmable Read Only Memory 204 of the Central Processing Unit 200. The Random Access Memory 206 is used for the storage of digitized audio and necessary program memory space. In addition to the overall operation of the system, the Central Processing Unit 200 maintains the necessary records for the accounting and physical maintenance of the machine.

The Central Processing Unit 200 also monitors and tests the power supply for the computer functions of the 1K Entertainment Center 10. Each additional ancillary machine is also monitored and tested by the Central Processing Unit 200.

Therefore, through use of the present invention, the consumer has access to a fully integrated system which contains a large (and changeable) library of many different types of songs from which the consumer may select any multiplicity he desires to create a cassette which has his/her individual favorite tunes. This affords the consumer the opportunity to acquire a large number of his/her favorite tunes on one cassette so that he/she can listen to them seriatim without having to hear unwanted songs. The system provides a fully integrated unit which can be compactly set up in any multiplicity of business establishments such as record stores, convenience stores, supermarkets, department stores, etc..

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms of modification in which the invention might be embodied.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What is claimed is:

1. An apparatus for producing an audio cassette tape composed of a multiplicity of randomly selected prerecordings comprising:
   a. an Input Processor Means;
   b. said Input Processor Means further comprising an Analog to Digital Converter Means;
   c. a First Laser Disc Means;
   d. a Second Laser Disc Means;
   e. said First Laser Disk Means reading information in the forward direction and said Second Laser Disc Means reading information in a reverse direction;
   f. said First Laser Disc Means and said Second Laser Disc Means connected to said Input Processor Means through a Laser Disc Interface Means;
   g. Money Machine Means connected through a Money Interface Means to said Input Processor Means;
   h. a Keyboard connected through Keyboard Interface Means to said Input Processor Means;
   i a Central Processing Unit;
   j. said Input Processor Means connected through an Input/Output Interface Means to said Central Processing Unit;
   k. said Central Processing Unit comprising Random Access Memory and Programmable Read Only Memory;
   l. said Central Processing Unit connected through said Input/Output Interface Means to an Output Processor Means;
   m. said Output Processor Means further comprising a Digital to Analog Converter Means;
   n. said Output Processor Means connected through an Audio-Video Interface Means to a Monitor;
   o. said Output Processor Means connected through a Printer Interface Means to a Printer;
   p. said Output Processor Means connected through a Selection Interface Means to a Selection Duplicating Means said Selection Duplication Means including a cassette recorder which records at approximately 15 times normal speed;
   q. an audio selection library contained within said First Laser Disc Means and said Second Laser Disc Means;
   r. said Central Processing Unit further comprising an internal micro processor programmed for, controlling on input to the Random Access Memory in the form of laser disc information from First Laser Disc Means and Second Laser Disc Means, controlling keyboard information from said Keyboard, controlling money regulation from said Money Machine Means, controlling printer output from said Printer, and controlling audio signal duplication by said Selection Duplicating Means; and
   s. said audio selection library initially stored on said First Laser Disc Means and said Second Laser Disc Means wherein a desired selection is converted from an analog to a digital signal by said Analog to Digital Converter Means of the Input Processor Means and thereafter stored in said Random Access Memory of said Central Processing Unit from which the Central Processing Unit removes the digital signal selected and transfers it through said Input/Output Interface Means to said Output Processor Means and then to said Digital to Analog Converter of the Output Processor Means which transforms the digitized audio signal to the analog format, and then the analog format signal is transferred through said selection Interface Means to said Selection Duplicating Means from which the signal of the desired selection is transferred to a cassette and recorded at approximately fifteen times normal speed;

t. whereby said Input Processor Means, said Central Processing Unit, and said Output Processor Means are interconnected by appropriate computer software to create an audio selection duplicating system wherein a selection of desired audio recordings which are stored on said First Laser Disc Means and said Second Laser Disc Means is chosen and input through said Keyboard and the appropriate amount of money is deposited into said Money Machine Means and the selections are transmitted from said First Laser Disc Means and said Second Laser Disc Means through said Input Processor Means to said Central Processing Unit and then to said Output Processor Means, and then to said Monitor where the selections are displayed, to said Printer where appropriate labels are produced and to said Selection Duplicating Means where the selected audio recordings are recorded onto a cassette at approximately fifteen times normal speed and the recorded cassette is thereafter dispensed from the system.

2. The Invention as defined in claim 1 wherein said Input Processor Means is a sixteen bit microprocessor with associated memory and communications software enabling it to support said Keyboard, said First Laser Disc Means, said Second Laser Disc Means, said Money Machine Means, and communications to said Central Processing Unit.

3. The Invention as defined in claim 1 wherein said Printer Means is a high speed parallel model printer.

4. The Invention as defined in claim 1 wherein said Output Processor Means is a sixteen bit microcomputer with associated memory and communications software enabling it to support and communicate with said Monitor, said Printer, and said Selection Duplicating Means.

5. The Invention as defined in claim 1 wherein said Central Processing Unit is a sixteen bit microcomputer with associated memory and communications software to interface with said Input Processor Means and said Output Processor Means.

6. The Invention as defined in claim 1 wherein an audio amplifier with high fidelity speakers is integrated into said Monitor.

7. The Invention as defined in claim 1 wherein said Central Processing Unit includes a self test function.

8. The Invention as defined in claim 1 wherein said Central processing Unit includes a service program.

* * * * *